(12) United States Patent
Göthe et al.

(10) Patent No.: US 12,378,671 B2
(45) Date of Patent: Aug. 5, 2025

(54) METHOD FOR SURFACE TREATMENT PRIOR TO METALLIZATION

(71) Applicant: CUPTRONIC TECHNOLOGY LTD., Limassol (CY)

(72) Inventors: Sven Göthe, Bromma (SE); Björn Atthoff, Uppsala (SE)

(73) Assignee: CUPTRONIC TECHNOLOGY LTD., Limassol (CY)

( * ) Notice: Subject to any disclaimer, the term of this patent is extended or adjusted under 35 U.S.C. 154(b) by 379 days.

(21) Appl. No.: 18/017,034

(22) PCT Filed: Jul. 23, 2021

(86) PCT No.: PCT/EP2021/070729
§ 371 (c)(1),
(2) Date: Jan. 19, 2023

(87) PCT Pub. No.: WO2022/018278
PCT Pub. Date: Jan. 27, 2022

(65) Prior Publication Data
US 2023/0272535 A1   Aug. 31, 2023

(30) Foreign Application Priority Data
Jul. 24, 2020   (SE) .................................... 2050920-4

(51) Int. Cl.
| | |
|---|---|
| C23C 18/20 | (2006.01) |
| C08F 2/46 | (2006.01) |
| C08F 4/04 | (2006.01) |
| C08F 4/34 | (2006.01) |
| C08F 220/06 | (2006.01) |
| C08F 283/04 | (2006.01) |
| C08F 285/00 | (2006.01) |
| C08J 7/18 | (2006.01) |
| C09D 4/00 | (2006.01) |
| C23C 18/16 | (2006.01) |
| C23C 18/28 | (2006.01) |
| C23C 18/30 | (2006.01) |
| C23C 18/38 | (2006.01) |

(52) U.S. Cl.
CPC ............ *C23C 18/2086* (2013.01); *C08F 2/46* (2013.01); *C08F 4/04* (2013.01); *C08F 4/34* (2013.01); *C08F 220/06* (2013.01); *C08F 283/04* (2013.01); *C08F 285/00* (2013.01); *C08J 7/18* (2013.01); *C09D 4/00* (2013.01); *C23C 18/2033* (2013.01); *C23C 18/204* (2013.01); *C08J 2323/00* (2013.01); *C08J 2333/08* (2013.01); *C08J 2333/10* (2013.01); *C08J 2355/02* (2013.01); *C08J 2375/04* (2013.01); *C08J 2377/02* (2013.01); *C08J 2433/02* (2013.01); *C08J 2433/14* (2013.01); *C08J 2467/02* (2013.01); *C23C 18/1653* (2013.01); *C23C 18/28* (2013.01); *C23C 18/30* (2013.01); *C23C 18/38* (2013.01)

(58) Field of Classification Search
CPC . C23C 18/2086; C23C 18/1653; C23C 18/28; C23C 18/30; C23C 18/38; C23C 18/204; C23C 18/2033; C23C 18/1641; C23C 18/1678; C23C 18/2066; C08J 7/18; C08J 2323/00; C08J 2333/08; C08J 2333/10; C08J 2355/02; C08J 2375/04; C08J 2377/02; C08J 2433/02; C08J 2433/14; C08J 2467/02; C08F 2/46; C08F 4/34; C08F 220/06; C08F 283/04; C08F 285/00; C08F 4/04; C09D 4/00; B05D 3/0218; B05D 3/101; B05D 2201/02; B05D 2503/00
See application file for complete search history.

(56) References Cited

U.S. PATENT DOCUMENTS

| | | | |
|---|---|---|---|
| 3,998,602 | A | 12/1976 | Horowitz et al. |
| 4,110,521 | A | 8/1978 | Barnett et al. |
| 4,954,371 | A | 9/1990 | Yializis |
| 2004/0071980 | A1 | 4/2004 | McBain et al. |
| 2006/0211236 | A1 | 9/2006 | Bureau et al. |

(Continued)

FOREIGN PATENT DOCUMENTS

| | | |
|---|---|---|
| CN | 104529185 A | 4/2015 |
| CN | 106460178 A | 2/2017 |
| EP | 0537746 | 4/1993 |

(Continued)

OTHER PUBLICATIONS

International Search Report for PCT Application No. PCT/EP2021/070729 mailed Nov. 15, 2021.

(Continued)

*Primary Examiner* — Adil A. Siddiqui
(74) *Attorney, Agent, or Firm* — Branch Partners PLLC; Bruce E. Black

(57) ABSTRACT

There is provided a method for treating a surface comprising heating the object and the object with a solution comprising a thermal initiator and a polymerizable molecule, wherein the polymerizable molecule reacts with the surface and forms a covalent bond and optionally a covalently bound polymer on the surface of the object. Metal ions are bound to the surface to make the surface possible for adding further metal later. Advantages include that complicated geometries can be coated, problems with oxygen inhibition of the initiator is reduced, and surface reaction to form covalent bonds is promoted compared to the bulk polymerization reaction.

13 Claims, No Drawings

(56) References Cited

U.S. PATENT DOCUMENTS

2009/0155553 A1    6/2009  Nagasaki

FOREIGN PATENT DOCUMENTS

| WO | WO9834446 | 8/1998 | |
|---|---|---|---|
| WO | WO2007116056 | 10/2007 | |
| WO | WO2007116057 | 10/2007 | |
| WO | WO2012066018 | 5/2012 | |
| WO | WO2013167598 | 11/2013 | |
| WO | WO2014039965 | 3/2014 | |
| WO | WO2014086844 | 6/2014 | |
| WO | WO2015165874 | 11/2015 | |
| WO | WO-2015165874 A1 * | 11/2015 | ......... C23C 18/1607 |
| WO | WO2015165875 | 11/2015 | |
| WO | WO2017060656 | 4/2017 | |

OTHER PUBLICATIONS

Written Opinion for PCT Application No. PCT/EP2021/070729 mailed Nov. 15, 2021.
International Preliminary Report on Patentability for PCT Application No. PCT/EP2021/070729 mailed Jan. 24, 2023.

* cited by examiner

METHOD FOR SURFACE TREATMENT PRIOR TO METALLIZATION

CROSS-REFERENCE TO RELATED APPLICATIONS

This present application is a U.S. national stage application of PCT Application No. PCT/EP2021/070729, filed Jul. 23, 2021, which claims priority to Swedish Patent Application No. 2050920-4, filed Jul. 24, 2020, both of which are hereby incorporated by reference in their entirety.

TECHNICAL FIELD

The invention relates to a step in a process for treating a surface prior to application of further layer(s) of for instance coatings, adhesives or other materials, involving covalent grafting of a molecule such as a polymer by heating the object and using the heat to initiate a polymerization reaction.

BACKGROUND

WO 1998/034446 discloses that suitable monomers together with a photoinitiator can be selectively inoculated on the surface of a non-conducting substrate in a distinct pattern by using irradiation with UV-light. Metal ions are thereafter absorbed by these monomers and are reduced. To this pattern further conducting materials, e.g., metals, can thereafter be added in a conventional way. The method according to the invention comprises a fully additive method to produce a circuit board with high resolution and the production of functional components directly on a non-conducting substrate.

WO 2007/116056 discloses a method for applying a first metal on paper, which method comprises the steps a) producing polymers on the surface of said paper, said polymers comprising carboxylic groups and adsorbed ions of at least one second metal, said ions being adsorbed at a pH above 7, b) reducing said ions to the second metal and c) depositing said first metal on the reduced ions of said second metal. The invention further comprises objects manufactured according to the method.

WO 2007/116057 discloses a method for applying a first metal on a substrate, which method comprises the steps a) producing polymers on the surface of said substrate, said polymers comprising carboxylic groups and adsorbed ions of at least one second metal, said ions being adsorbed at a pH above 7, b) reducing said ions to the second metal and c) depositing said first metal on the reduced ions of said second metal. The invention further comprises objects manufactured according to the method.

WO 2012/066018 discloses a method for applying a metal on a substrate comprises: a) applying a coating by treatment in a plasma, comprising a compound selected from alkanes up to 10 carbon atoms, and unsaturated monomers, and b1) producing polymers on the surface of said substrate, said polymers comprising carboxylic groups and adsorbed ions of a second metal, reducing said ions to the second metal, or alternatively b2) producing polymers on the surface, bringing the surface of said substrate in contact with a dispersion of colloidal metal particles of at least one second metal, and c) depositing said first metal on said second metal.

WO 2013/167598 discloses a process for application of metal on a substrate surface comprises applying a mixture of a solvent, a polymerizable monomer, and a photoinitiator on a substrate surface, wherein the photoinitiator does not form two phases together with the monomer and the solvent, i.e. it forms an amorphous mixture without any crystals. The monomer is able to polymerize to a polymer comprising at least one carboxylic group. Thereafter the solvent is evaporated. Polymerization is induced by irradiating the applied dried mixture. Ions are applied and reduced to metal and thereafter further metal can be deposited. The method can be used in industrial processes, both 2D and 3D surfaces can be coated with metal. Materials sensitive to standard grafting chemicals and/or polymers containing halogen atoms can be coated.

WO 2014/086844 discloses a method for application of a metal on a cavity filter comprising contacting at least a part of said cavity filter base with a mixture, and inducing a polymerization reaction by exposure to at least one selected from heat and actinic radiation adapted to said at least one initiator to form polymers on at least the inner surface of said cavity filter base, said polymers comprising at least one charged group, and said polymers forming covalent bonds after reaction with at least one selected from an abstractable hydrogen atom and an unsaturation on said cavity filter base, and subsequently applying further metal.

WO 2015/165874 discloses a method of metallizing substrate with abstractable hydrogen atoms and/or unsaturations on the surface, comprising the steps: a) contacting the substrate with a polymerizable unit, at least one initiator which can be activated by both heat and actinic radiation, and optionally at least one solvent, b) inducing a polymerization reaction c) depositing a second metal on an already applied first metal to obtain a metal coating. A first metal is added as ions and/or small metal particles during the process. Ions are reduced to the first metal.

WO 2015/165875 discloses a method for application of a metal on a substrate, comprising the steps: a) contacting at least a part of the surface of the substrate with at least one selected from: i) at least one initiator, and a polymerizable unit with the ability to undergo a chemical reaction to form a polymer, said polymer comprising at least one charged group, and ii) a polymer comprising at least one charged group. The contacting is achieved by contacting a pad with a plate comprising the at least one substance and subsequently contacting the pad with the surface of the substrate, thereby transferring the at least one substance to the surface of the substrate. Subsequently a metal layer is produced on the surface.

US 2006/0211236 discloses a process for coating a surface of a substrate with a seed film of a metallic material, said surface being an electrically conductive or semiconductive surface and having recesses and/or projections.

U.S. Pat. No. 4,110,521 discloses a method where preheating is used for heating the temperature of a bulk solution before final heating.

WO 2014/039965 discloses a method for molding a composite structure including preheating to a temperature that renders the composite material more drapable, but is less than a temperature that causes the resin in the material to initiate polymerization. The ply of composite material is then transferred to a press station where it is heated to a temperature that causes the resin to initiate polymerization.

U.S. Pat. No. 4,954,371 discloses a solution comprising monomers, which are brought into contact with a heated surface. Various methods of polymerizing are mentioned. E-beam is preferred, but thermal is also mentioned. Grafting onto the surface does not take place, instead a film is formed. The entire thickness of applied monomers are polymerized.

EP 0537746 discloses a method for preparing a molded product which comprises (i) molding a fiber-reinforced plastic material in a mold, (ii) injecting a coating composition into the mold, and (iii) taking the coated molded product from the mold and plating the surface of the product. The injected coating composition is heated both from both sides.

Although the technology according to the state of the art is working satisfactory there is still room for improvement, especially for certain cases.

For UV-initiated reactions there is a problem with difficult geometries, such as cavities and other similar shapes, where it is difficult or impossible to obtain good irradiation with UV-light.

Further for heat initiated reactions and/or combinations of initiation with both heat and actinic irradiation, there is the problem that the heat initiation is not sufficiently efficient. For similar heat initiated reactions in the prior art it has been necessary to combine the heat initiation with irradiation with actinic irradiation such as UV in order to obtain sufficient initiation in many cases.

When the surface treatment is carried out in a normal atmosphere there is the problem that oxygen reacts with the radicals formed by the initiator and thereby reduces the efficiency of the initiator. In large scale it is difficult and expensive to have an atmosphere with low concentration of oxygen.

SUMMARY

It is an object of the present invention to alleviate at least some of the problems in the prior art and to provide a method for treating a surface.

In a first aspect there is provided a method for treating a surface of an object comprising the sequential steps of a) heating the object, and b) contacting at least a part of the surface of the object with a solution comprising a thermal initiator and a polymerizable molecule, wherein the surface of the object comprises reactive groups selected from abstractable hydrogen atoms and C=C double bonds, wherein the polymerizable molecule is able to undergo a reaction with the reactive groups on the surface of the object to form a covalent bond, wherein the polymerizable molecule is able to undergo a polymerization reaction to form a polymer, wherein the object is heated at least to a temperature where the thermal initiator is active, wherein polymerizable molecules are covalently bound to the surface of the object in step b) by a reaction initiated by the thermal initiator in combination with heat from step a), wherein the covalently bound polymerizable molecules comprise a charge, and a step c) contacting the polymerizable molecule with at least one type of metal ions wherein the metal ions have a charge with an opposite sign compared to the charge of the covalently bound polymerizable molecules.

In a second aspect there is provided an object treated according to the method as described above, wherein the object comprises charged molecules covalently bound to the surface of the object and elemental metal One advantage is that a high radical concentration is obtained closest to the object since the solution in contact with the object is heated quickly. The high radical concentration makes the process less sensitive to inhibition by oxygen, which otherwise may consume the formed radicals so that the initiation becomes less efficient. Oxygen dissolved in the solution will be consumed by the high concentration of radicals and there is still a remaining sufficient amount of radicals to perform an efficient initiation of the desired reaction. The reaction is quick so that diffusion of additional oxygen from the surrounding is very limited.

The radical concentration is highest closest to the surface in the applied solution and this gives a higher degree of formation of covalent bonds to the surface, i.e. a higher density of grafted molecules/polymers on the surface. This in turn can give better adhesion.

Since the radical concentration is highest in the applied solution closest to the surface of the object, the grafting at the surface is favoured compared to polymerization in the bulk of the applied solution of non-covalently bound polymers.

Further the coating is independent on irradiation with light and thereby complicated geometries can be coated as long as the solution can be applied to the surface to be coated.

DETAILED DESCRIPTION

The following detailed description discloses by way of examples details and embodiments by which the invention may be practised.

It is to be understood that the terminology employed herein is used for the purpose of describing particular embodiments only and is not intended to be limiting since the scope of the present invention is limited only by the appended claims and equivalents thereof.

If nothing else is defined, any terms and scientific terminology used herein are intended to have the meanings commonly understood by those of skill in the art to which this invention pertains.

In the first aspect there is provided a method for treating a surface of an object comprising the sequential steps of a) heating the object, and b) contacting at least a part of the surface of the object with a solution comprising a thermal initiator and a polymerizable molecule, wherein the surface of the object comprises reactive groups selected from abstractable hydrogen atoms and C=C double bonds, wherein the polymerizable molecule is able to undergo a reaction with the reactive groups on the surface of the object to form a covalent bond, wherein the polymerizable molecule is able to undergo a polymerization reaction to form a polymer, wherein the object is heated at least to a temperature where the thermal initiator is active, wherein polymerizable molecules are covalently bound to the surface of the object in step b), by a reaction initiated by the thermal initiator in combination with heat from step a), wherein the covalently bound polymerizable molecules comprise a charge, and a step c) contacting the polymerizable molecule with at least one type of metal ions, wherein the metal ions have a charge with an opposite sign compared to the charge of the covalently bound polymerizable molecules.

In one embodiment the metal ions are Pd-ions. In one embodiment the metal ions are selected from the group consisting of ions of Pd, Cu and Ag.

The contacting of metal ions with the polymerizable molecule gives an amount of metal ions bound to the polymerizable molecules, in particular for the case where the polymerizable molecules are charged with an opposite charge compared to the metal ions. This is also applicable for the case where the polymerizable molecules are polar. Polar groups on the covalently bound polymerizable molecule will act as a charge. This is the case both when the polymerizable molecules are covalently bound to the surface and where the polymerizable molecules are further reacted to obtain polymer chains covalently bound to the surface.

In one embodiment the metal ions are reduced to elemental metal after the contacting step. After the reduction to elemental metal further metal can be applied using well known methods for application of metal on existing metal. Even if the amount of elemental metal is small it can nevertheless serve as a base for application of further metal using known methods.

The object is heated to a temperature which equals or is above the temperature at which the thermal initiator is active. The thermal initiator decomposes when heated and forms a radical which can initiate a reaction. The thermal initiator is usable in a certain temperature window. The object is heated so that the heat from the object initiates the reaction, when brought into contact with the solution comprising the initiator and the polymerizable molecule. The polymerizable molecule reacts with groups on the surface of the object after initiation so that the polymerizable molecule becomes covalently bound to the surface of the object.

The thermal initiator and the material in the object should be adapted to each other. The object must be able to withstand the temperature at which the thermal initiator in the solution is active, at least a part of the usable temperature range of the thermal initiator. Thus the object and the thermal initiator should be selected so that the thermal initiator can be active at a temperature which does not have any negative impact on the object. For instance, thermoplastic polymers often have a relatively low softening temperature and this has to be considered when selecting the thermal initiator so that the object does not soften and deform during the heating. Thermoset polymers on the other hand can most often withstand elevated temperatures better and then a wider temperature range can be utilized. The lower temperature limit is determined by the thermal initiator so that the thermal initiator decomposes to a radical at the temperature. The upper temperature limit is most often determined by the object to be treated so that the object is not destroyed or adversely affected by the temperature. This gives a temperature window when a suitable thermal initiator is selected depending on the material in the object.

In one embodiment the object is heated until it has essentially the same temperature throughout the entire object. A short heating time may result in that the object is warm on the surface and close to the surface, but has a lower temperature inside. In one embodiment it is desired that the object is heated so that its heat storage is maximized, which occurs when it is heated throughout its volume. In one embodiment a slight temperature variation is tolerated between the surface and the inside of the object. In one embodiment the object is heated in a convection oven for 30 minutes.

The quick heating of the solution with heat from the object gives a high concentration of radicals and a quick release of radicals. This gives an efficient initiation and is much more efficient compared to heating the object together with the applied solution, which would give a much slower release of radicals over a longer time. The high concentration of radicals makes the process less prone to disturbance from oxygen. When the radical concentration is high, dissolved oxygen in the solution will be consumed by the radicals and still the remaining radicals will be able to initiate polymerization and grafting. This is opposed to the situation where the object is heated together with the applied solution, then the radicals will be released at a slower pace and giving rise to lower concentration of radicals which to a large extent will be consumed by oxygen so that the initiation will be less efficient. In the latter case additional oxygen will also be able to diffuse into the solution since the process is much slower.

The heating of the applied solution is independent of the geometry of the object as long as the solution can be applied in a suitable thickness. The initiation is not dependent on UV-irradiation or other actinic irradiation and thus cavities can be coated as long as it is possible to apply the solution in contact with the object.

The solution is in one embodiment applied in a thin layer such as for instance 10-5000 µm. The layer of applied solution is heated with heat from the object. This give maximum heating in the solution closest to the surface, which is desired. Thereby maximum concentration of radicals is achieved closest to the surface and this gives more points where the polymerizable molecule is covalently bound to the surface. Thus a higher density of covalently bound polymers can be created on the surface by using this method.

In the applied solution some degree of polymerization and formation of non-covalent polymers can occur. Such polymerization is not desired and polymers which are not covalently bound are in one embodiment washed away after step b). Since the heat dissipates from the object into the applied solution the part of the applied solution closest to the object surface is heated first and to a greater extent, and this favours formation of covalent bonds to the surface compared to polymerization in the bulk of non-covalently bound polymers.

In one embodiment the polymerizable molecules covalently bound to the surface of the object in step b) are further reacted with the polymerizable molecules during step b) to obtain polymer chains covalently bound to the surface of the object. The polymerization reaction can thus propagate so that covalently bound polymer chains are created, grafted to the surface. The relation between polymerizable molecule and initiator in the solution controls the chain length. Also the reaction time can to some extent affect the chain length.

In one embodiment the object is made with injection molding, and wherein the remaining heat after the injection molding is utilized at least partially as heat for step a). During injection molding a polymer is heated and injected into a mold. When the object is released from the mold it is still hot and this heat can be utilized so that the object is transferred from the injection molding directly to the treatment according to the invention without unnecessary delay. If the heat is not sufficient additional heating can be performed.

In one embodiment the object comprises a thermosetting polymer and the remaining heat after the curing is utilized at least partially as heat for step a). A thermosetting polymer is cured by applying heat and directly after the curing the object can be treated according to the invention without unnecessary delay. If the heat is not sufficient additional heating can be performed.

In one embodiment the object is heated in step a) in a convection oven. In one embodiment the object is heated in an oven.

In one embodiment the object is heated in step a) with IR-irradiation. In one embodiment the object is heated in step a) by microwaves. In one embodiment the object is heated in step a) by laser-irradiation.

Any combination of heating methods are also encompassed. Thus it is for instance possible to heat the object by IR-irradiation and by microwaves or any other combination.

In one embodiment the object is heated in a desired pattern and/or on desired parts so that the coating only occurs at the desired heated parts. By such a method it is possible to coat a part of an object or to make a pattern on an object.

In one embodiment the object is heated a second time with IR-irradiation immediately before step b). After a first heating by any method it is possible to heat the object again just before it is contacted with the solution. In one embodiment the solution is contacted with the object no more than 5 seconds after a final heating. In one embodiment it may not be possible to apply the solution immediately after a first heating for some reason. In such a case a second heating can be performed immediately before the solution is applied so that the object has the desired temperature when it contacts the surface. Such a second heating is conveniently carried out with IR-irradiation. For instance, an IR-lamp can easily be placed in a process line just before a step where the solution is applied on the heated object. Then the object will get a bit of additional heating just before the coating of the grafting solution. In an alternative embodiment such an IR irradiation is the only heating step.

After application of the solution any further heating would generally not be desired, since the heat dissipating form the object to the solution heats the solution closest to the object as desired. Further heating after application of the solution would not have this effect.

In one embodiment a second object is heated and held in thermal contact with the object during step b). Such a second object is in one embodiment made of a material with good thermal conductivity such as a metal. If the object to be coated is thin the heat may dissipate quickly, in such an embodiment another object can be heated and placed in thermal contact with the object during step b). Then heat will be transferred from the second object to the object. The shape of such a second object is preferably adapted to the shape of the object for best heat transfer.

The solution is transferred to the object by any suitable method as known in the art. In one embodiment the at least a part of the surface of the object is contacted with the solution by at least one of the methods selected from the group consisting of spray, inkjet, wire bar applicator, padprint, curtain coating, brush, rolling, and dipping. The skilled person realizes that also other additives can be added to the solution, such as for instance rheology modifiers. The different application method may require the viscosity of the solution to be adjusted and this can be made by adding an additive.

In one embodiment the molecules covalently bound to the surface of the object in step b) are charged.

In one embodiment oppositely charged ions are adsorbed to the charged molecules. In one embodiment the ions are metal ions and wherein the ions are reduced to elemental metal. In one embodiment further metal is applied on the elemental metal. By this method a layer of metal can be added to the grafted covalently bound polymers. Excellent adhesion is obtained for such an applied metal coating.

In one embodiment the thermal initiator is at least one selected from the group consisting of peroxides and azo-compounds.

In one embodiment the polymerizable molecule is at least selected from an organic acid, a hydroxyl, an amine, a thiol, an oxirane, an isocyanate. Also other reactive functional molecules are encompassed. Combinations of the mentioned molecules are also encompassed as the polymerizable molecule. In one embodiment the polymerizable molecule is at least one selected from an organic acid, an amine, a thiol, an oxirane, and an isocyanate.

EXAMPLES

Example 1

Samples were prepared according to the invention. Objects of polyamide 6 and ABS (Acrylonitrile Butadiene Styrene, thermoplastic polymer) were heated in a convection oven for 30 minutes in 100° C. Immediately before application of the solution they were heated with an IR-lamp with 200 W for 5, 10, or 15 seconds. The time from the end of the last IR-irradiation to the contacting of the solution was 3-5 seconds.

IR-11 (Acrylic acid 4 g, Ammonia (aq) 2 g, 2-hydroxy ethyl acrylatel 1 g, Ethanol 5 g, 4,4'-Azobis(4-cyanovaleric acid) 0.2 g), IR-28 (Acrylic acid 4 g, Ammonia (aq) 1 g, 2-hydroxy ethyl acrylatel 1 g, Ethanol 5 g, 4,4"-Azobis(4-cyanovaleric acid) 0.2 g) and IR-29 (Acrylic acid 4 g, Ammonia (aq) 2 g, 2-hydroxy ethyl acrylatel 1 g, Ethanol 5 g, Polyester oligomer 1.75 g, 4,4"-Azobis(4-cyanovaleric acid) 0.2 g) was applied as solution with an applicator (rod) or spray.

The grafted surface was washed with a 70% ethanol in water.

The panels were dipped into a solution containing Pd-ions which were absorbed on the panel. The Pd ions were reduced to elemental Pd. The panel were then dipped into a chemical copper solution to apply a thin copper layer. Then a 20 μm thick layer of copper was applied with a conventional electrolytic method.

Pull tests were performed by cutting and pulling away strips of applied metal and measuring the required force. The values in N/cm can be seen in the below table.

| Material | sample | 1 N/cm | 2 N/cm | 3 N/cm | 4 N/cm | 5 N/cm | Grafting | Application | Heating in owen 100° C. | IR-LAMP 10 cm distance/time |
|---|---|---|---|---|---|---|---|---|---|---|
| PA6 | A | 9.3 | 11.2 | 8.3 | 9.3 | 9.1 | IR-11 | Rod | 30 min | 5 s |
| PA6 | A1 | 6.5 | 10.2 | 5.5 | 10.5 | 6.5 | IR-11 | Rod | 30 min | 10 s |
| PA6 | A2 | 6.6 | 7.8 | 5.1 | 6.7 | 7.2 | IR-11 | Rod | 30 min | 15 s |
| PA6 | A3 | 8.6 | 9.2 | 9.3 | 10.1 | | IR-11 | Rod | 30 min | 5 s |
| PA6 | A4 | 7.5 | 7.3 | 8.3 | 10.4 | 8.8 | IR-11 | Rod | 30 min | 10 s |
| PA6 | A5 | 9.7 | 9.4 | 8.7 | 9.0 | | IR-11 | Rod | 30 min | 15 s |
| PA6 | A6 | 10.9 | 11.2 | | | | IR-11 | Rod | 30 min | 5 s |
| PA6 | A7 | 6.8 | 6.5 | 7 | 8.5 | | IR-11 | Rod | 30 min | 10 s |
| PA6 | A8 | 6.8 | 5.3 | 5.5 | 5.4 | | IR-11 | Rod | 30 min | 15 s |
| PA6 | B | 9.5 | 9.3 | 8 | 10.8 | 10.6 | IR-28 | Rod | 30 min | 5 s |

-continued

| Material | sample | 1 N/cm | 2 N/cm | 3 N/cm | 4 N/cm | 5 N/cm | Grafting | Application | Heating in owen 100° C. | IR-LAMP 10 cm distance/ time |
|---|---|---|---|---|---|---|---|---|---|---|
| PA6 | B1 | 7.2 | 9.7 | 9.7 | 11.7 | | IR-28 | Rod | 30 min | 10 s |
| PA6 | B2 | 10.2 | 12.3 | 11.1 | 12.5 | 10.4 | IR-28 | Rod | 30 min | 15 s |
| PA6 | B3 | 9.7 | 12.8 | 9.9 | 10.7 | 7.5 | IR-29 | Rod | 30 min | 5 s |
| PA6 | B4 | 12.9 | 9.2 | 13.6 | 14.1 | 15.4 | IR-29 | Rod | 30 min | 10 s |
| ABS | B5 | 5.6 | 6.1 | 5.9 | | | IR-29 | Rod | 30 min | 5 s |
| ABS | B6 | 6.2 | 6.8 | 5.9 | 5.7 | | IR-29 | Rod | 30 min | 10 s |
| PA6 | B7 | 13.9 | 11.2 | 10.1 | 9.2 | | IR-29 | Rod | 30 min | 5 s |
| PA6 | B8 | 8.5 | 8.1 | 8.3 | 9.2 | 8.4 | IR-29 | Rod | 30 min | 10 s |
| PA6 | B9 | 13.2 | 13.7 | 12.8 | 14.2 | 13.4 | IR-29 | Spray | 30 min | 10 s |
| PA6 | B10 | 11.9 | 14.6 | 9.7 | 12.6 | 11.0 | IR-29 | Spray | 30 min | 15 s |

Example 2

A panel of carbon black filled TPO material (Thermo Plastic Olefin) has been treated as described below:

A grafting resin solution consisting of acrylic acid (10.0 weight-%), 4,4″-Azobis(4-cyanovaleric acid) (0.1 weight-%), ethanol (85 weight-%) and one component urethane resin (5 weight-%) was prepared.

The panels were heated in a convection oven for 30 minutes in 100° C. Immediately before application of the solution they were heated with an IR-lamp with 200 W for 10 seconds. The time from the end of the last IR-irradiation to the contacting of the solution was 3-5 seconds.

The solution was sprayed by an air spray gun to TPO panels of 8×16 cm size. The wet film thickness was 45 to 75 µm.

The grafted surface was washed with a 70% ethanol in water.

The panels were dipped into a solution containing Pd-ions which were absorbed on the panel. The Pd ions were reduced to elemental Pd. The panel were then dipped into a chemical copper solution to apply a thin copper layer. Then a 20 µm thick layer of copper was applied with a conventional electrolytic method.

Pull tests were performed by cutting and pulling away strips of applied metal and measuring the required force. The force was in average 8.1 N/cm.

Example 3

A clear transparent COC material (Cyclic Olefinic Coploymer) has been treated as described below:

A grafting solution consisting of 2-hydroxy ethylacrylate/methacrylic acid (20/30 weight-%), α,α'-Azoisobutyronitrile (AIBN) (0.6 weight-%), cyclohexane and a polyester oligomer resin (10 weight-%) was prepared.

The panels were heated in a convection oven for 30 minutes in 125° C. Immediately before application of the solution they were heated with an IR-lamp with 200 W for 5 seconds. The time from the end of the last IR-irradiation to the contacting of the solution was 3-5 seconds.

The solution was sprayed by an air spray gun to COC panels of 10×10 cm size. The wet film thickness was to 60 µm.

The grafted surface was washed with a 70% ethanol in water.

The panels were dipped into a solution containing Pd-ions which were absorbed on the panel. The Pd ions were reduced to elemental Pd. The panel were then dipped into a chemical copper solution to apply a thin copper layer. Then a 20 µm thick layer of copper was applied with a conventional electrolytic method.

Pull tests were performed by cutting and pulling away strips of applied metal and measuring the required force. The force was in average 11.3 N/cm.

Example 4

A Polyamide 6 (PA6) material has been treated as described below:

A grafting solution consisting of acrylic acid 12 weight-%, ammonia 4 weight-%, glycidyl methacrylate/ethyl acrylate (20/15 weight-%), α,α'-Azoisobutyronitrile (AIBN) (0.9 weight-%) and ethanol was prepared.

The panels were heated in a microwave oven for 3 minutes reaching a surface temperature of 115° C. The time to the contacting of the solution was 3-5 seconds.

The PA6 panels panels of 5×10 cm size were dipped in the solution. The wet film thickness was 200 to 400 µm. The grafted surface was washed with an ethanol/ethylacetate (1/1) solution.

The panels were dipped into a solution containing Pd-ions which were absorbed on the panel. The Pd ions were reduced to elemental Pd. The panel were then dipped into a chemical copper solution to apply a thin copper layer. Then a 20 µm thick layer of copper was applied with a conventional electrolytic method.

Pull tests were performed by cutting and pulling away strips of applied metal and measuring the required force. The force was in average 14.7 N/cm.

Example 5

A PUR material (polyurethane) has been treated as described below:

A grafting solution consisting of glycidyl methacrylate/ethyl acrylate (35/15 weight-%), Dicumyl peroxide (1.0 weight-%) and isopropanol was prepared.

The panels were heated in a microwave oven for 2.5 minutes reaching a surface temperature of 110° C. The time to the contacting of the solution was 3-5 seconds.

The PUR panels panels of 6×6 cm size were curtain coated. The wet film thickness was 150 to 400 µm.

The grafted surface was washed with an ethanol/ethylacetate (1/1) solution.

The panels were dipped into a solution containing Pd-ions which were absorbed on the panel. The Pd ions were reduced to elemental Pd. The panel were then dipped into a chemical copper solution to apply a thin copper layer. Then a 20 μm thick layer of copper was applied with a conventional electrolytic method.

Pull tests were performed by cutting and pulling away strips of applied metal and measuring the required force. The force was in average 8.7 N/cm Example 6

A panel of glass fibre filled epoxy (Thermoset material) has been treated as described below:

A grafting resin solution consisting of THIOCURE® TMPMP (thiol) (12 weight-%), 4,4"-Azobis(4-cyanovaleric acid) (0.4 weight-%), ethanol (53 weight-%) and one component urethane resin (35 weight-%) was prepared.

The panels were heated in a convection oven for 20 minutes in 130° C. The time to the contacting of the grafting solution was 3-5 seconds.

The grafting solution was sprayed by an air spray gun to glass fibre filled epoxy panels of 10×10 cm size. The wet film thickness was 50 to 70 μm.

The grafted surface was washed with a 70% ethanol.

The panels were dipped into a solution containing Pd-ions which were absorbed on the panel. The Pd ions were reduced to elemental Pd. The panel were then dipped into a chemical copper solution to apply a thin copper layer. Then a 20 μm thick layer of copper was applied with a conventional electrolytic method.

Pull tests were performed by cutting and pulling away strips of applied metal and measuring the required force. The force was in average 8.5 N/cm Example 7

Transparent polyester films have been treated with corona, flame, chlorinated olefin and grafting solution. A comparison between different methods are described in figure:

A grafting solution consisting of 2-hydroxy ethylacrylate/methacrylic acid (20/30 weight-%), α,α'-Azoisobutyronitrile (AIBN) (0.6 weight-%), cyclohexane and a polyester oligomer resin (10 weight-%) was prepared.

The panels were heated in a convection oven for 5 minutes in 110° C. Immediately before application of the solution they were heated with an IR-lamp with 200 W for 10 seconds. The time from the end of the last IR-irradiation to the contacting of the solution was 3-5 seconds.

The solution was sprayed by an air spray gun to transparent polyester films. The wet film thickness was to 40 μm.

The grafted surface was washed with a 70% ethanol in water.

The panels were dipped into a solution containing Pd-ions which were absorbed on the panel. The Pd ions were reduced to elemental Pd. The panel were then dipped into a chemical copper solution to apply a thin copper layer. Then a 20 μm thick layer of copper was applied with a conventional electrolytic method.

Pull tests were performed by cutting and pulling away strips of applied metal and measuring the required force. The force was in average 9.6 N/cm.

Example 8

Objects of PA6 (Polyamide 6) and ABS (Acrylonitrile Butadiene Styrene) injection molded. Immediately after the injection molded process when the objects still were warm the application of the solution were applied at different times (10 seconds, 30 seconds and 60 seconds). The solution was applied after the objects had been removed from the mold.

IR-11 (Acrylic acid 4 g, Ammonia (aq) 2 g, 2-hydroxy ethyl acrylatel 1 g, Ethanol 5 g, 4,4"-Azobis(4-cyanovaleric acid) 0.2 g), IR-28 (Acrylic acid 4 g, Ammonia (aq) 1 g, 2-hydroxy ethyl acrylatel 1 g, Ethanol 5 g, 4,4"-Azobis(4-cyanovaleric acid) 0.2 g) and IR-29 (Acrylic acid 4 g, Ammonia (aq) 2 g, 2-hydroxy ethyl acrylatel 1 g, Ethanol 5 g, Polyester oligomer 1.75 g, 4,4"-Azobis(4-cyanovaleric acid) 0.2 g) was applied as solution with an spray gun.

After the grafting process the objects (PA6 ABS) were surface washed with a 70% ethanol in water.

In the next step were the panels dipped into a solution containing Pd-ions which were absorbed on the panel. The Pd ions were reduced to elemental Pd. The panel were then dipped into a chemical copper solution to apply a thin copper layer. Then a 20 μm thick layer of copper was applied with a conventional electrolytic method.

Pull tests were performed by cutting and pulling away strips of applied metal and measuring the required force. The values in N/cm can be seen in the below table.

As reference a cold PA6 panel and cold ABS panel were having the same treatment as above. No copper layer was then formed.

| Material | Sample | 1 N/cm | 2 N/cm | 3 N/cm | 4 N/cm | Grafting | Application | Coating of grafting solution after IM |
|---|---|---|---|---|---|---|---|---|
| PA6 | A | 10.2 | 9.5 | 9.1 | 9.6 | IR-11 | Spray | 10 sec |
| PA6 | A1 | 8.7 | 9.1 | 8.2 | 9.2 | IR-11 | Spray | 30 sec |
| PA6 | A2 | 7.1 | 6.9 | 6.2 | 7.5 | IR-11 | Spray | 60 sec |
| ABS | B1 | 6.2 | 6.8 | 6.9 | 7.1 | IR-11 | Spray | 10 sec |
| ABS | B2 | 5.9 | 6.0 | 5.8 | 5.7 | IR-11 | Spray | 30 sec |
| ABS | B3 | 4.9 | 5.2 | 4.7 | 5.0 | IR-1 | Spray | 60 sec |

The invention claimed is:

1. A method for treating a surface of an object comprising the sequential steps of:
   a) heating the object
   b) contacting at least a part of the surface of the object with a solution comprising a thermal initiator and polymerizable molecules,
   wherein the surface of the object comprises reactive groups selected from abstractable hydrogen atoms and C=C double bonds,
   wherein the polymerizable molecules are able to undergo a reaction with the reactive groups on the surface of the object to form a covalent bond,
   wherein the polymerizable molecules are able to undergo a polymerization reaction to form a polymer,
   wherein the object is heated at least to a temperature where the thermal initiator is active, wherein the polymerizable molecules are covalently bound to the surface of the object in step b), by a reaction initiated by the thermal initiator in combination with heat from step a), wherein the covalently bound polymerizable molecules comprise a charge, wherein the at least a part of the surface of the object is contacted with the solution by at least one of the methods selected from the group consisting of spray, inkjet, wire bar applicator, padprint, curtain coating, brush, rolling, or dipping, c) contacting the polymerizable molecules with at least one type of metal ions, wherein the metal ions have a charge with an opposite sign compared to the charge of the covalently bound polymerizable molecules, and d) reducing the metal ions to elemental metal.

2. The method according to claim 1, wherein the polymerizable molecules covalently bound to the surface of the object in step b) are further reacted with the polymerizable molecules during step b) to obtain polymer chains covalently bound to the surface of the object.

3. The method according to claim 1, wherein the abstractable hydrogen atom is a hydrogen atom in at least one selected from a urethane group, an amine group, a thiol group, a hydroxyl group, a methyl group, and a methylene group.

4. The method according to claim 1, wherein the object is made with injection molding, and wherein the remaining heat after the injection molding is utilized at least partially as heat for step a).

5. The method according to claim 1, wherein the object comprises a thermosetting polymer and the remaining heat after curing is utilized at least partially as heat for step a).

6. The method according to claim 1, wherein the object is heated in step a) in a convection oven.

7. The method according to claim 1, wherein the object is heated in step a) with IR-irradiation.

8. The method according to claim 1, wherein the object is heated in step a) by microwaves.

9. The method according to claim 1, wherein the object is heated in step a) by laser-irradiation.

10. The method according to claim 1, wherein the object is heated a second time with IR-irradiation immediately before step b).

11. The method according to claim 1, wherein a second object is heated and held in thermal contact with the object during step b).

12. The method according to claim 1, wherein the thermal initiator is at least one selected from the group consisting of peroxides or azo-compounds.

13. The method according to claim 1, wherein the polymerizable molecules are at least one selected from the group consisting of an organic acid, an amine, a thiol, an oxirane, or an isocyanate.

* * * * *